（12） United States Patent
Ito

(10) Patent No.: US 7,228,469 B2
(45) Date of Patent: Jun. 5, 2007

(54) PORTABLE INFORMATION DEVICE, METHOD FOR RECOVERING DATA IN PORTABLE INFORMATION DEVICE, AND COMPUTER PRODUCT

(75) Inventor: Yoshinori Ito, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 394 days.

(21) Appl. No.: 10/335,128

(22) Filed: Jan. 2, 2003

(65) Prior Publication Data

US 2004/0133838 A1    Jul. 8, 2004

(51) Int. Cl.
*G11C 29/00* (2006.01)
*G06F 11/00* (2006.01)

(52) U.S. Cl. .................... 714/718; 714/15; 714/766
(58) Field of Classification Search ............... 714/15, 714/718, 766, 770, 805; 365/200, 201, 52; 710/5; 235/492
See application file for complete search history.

(56) References Cited

U.S. PATENT DOCUMENTS

| 4,528,665 A | * | 7/1985 | Burns et al. | 714/805 |
| 4,682,328 A | * | 7/1987 | Ramsay et al. | 714/15 |
| 5,950,013 A | * | 9/1999 | Yoshimura et al. | 710/5 |
| 6,454,172 B1 | * | 9/2002 | Maeda et al. | 235/492 |

FOREIGN PATENT DOCUMENTS

| JP | 5-241970 | 9/1993 |
| JP | 9-204205 | 8/1997 |

OTHER PUBLICATIONS

"New Fujitsu iPAD brings retailing to the palm of your hand"; Fujitsu Transaction Solutions, Inc.; Press Release dated Jan. 13, 2002 (2 pages).

* cited by examiner

*Primary Examiner*—Guy Lamarre
*Assistant Examiner*—John J. Tabone, Jr.
(74) *Attorney, Agent, or Firm*—Armstrong, Kratz, Quintos, Hanson & Brooks, LLP

(57) ABSTRACT

A volatile memory stores data related to application program. Data that is the same as the data in the volatile memory is also stored in a nonvolatile memory. When writing the data from the volatile memory to the nonvolatile memory, it is confirmed that the data has no error. A parity bit for each data block in the volatile memory is stored in the volatile memory. It is then decided whether or not there is an error in the data stored in the volatile memory based on the parity bits. If an error is detected in the data stored in the volatile memory then the data is recovered or corrected by using the data in the nonvolatile memory. Data can be thus recovered speedily and reliably.

16 Claims, 9 Drawing Sheets

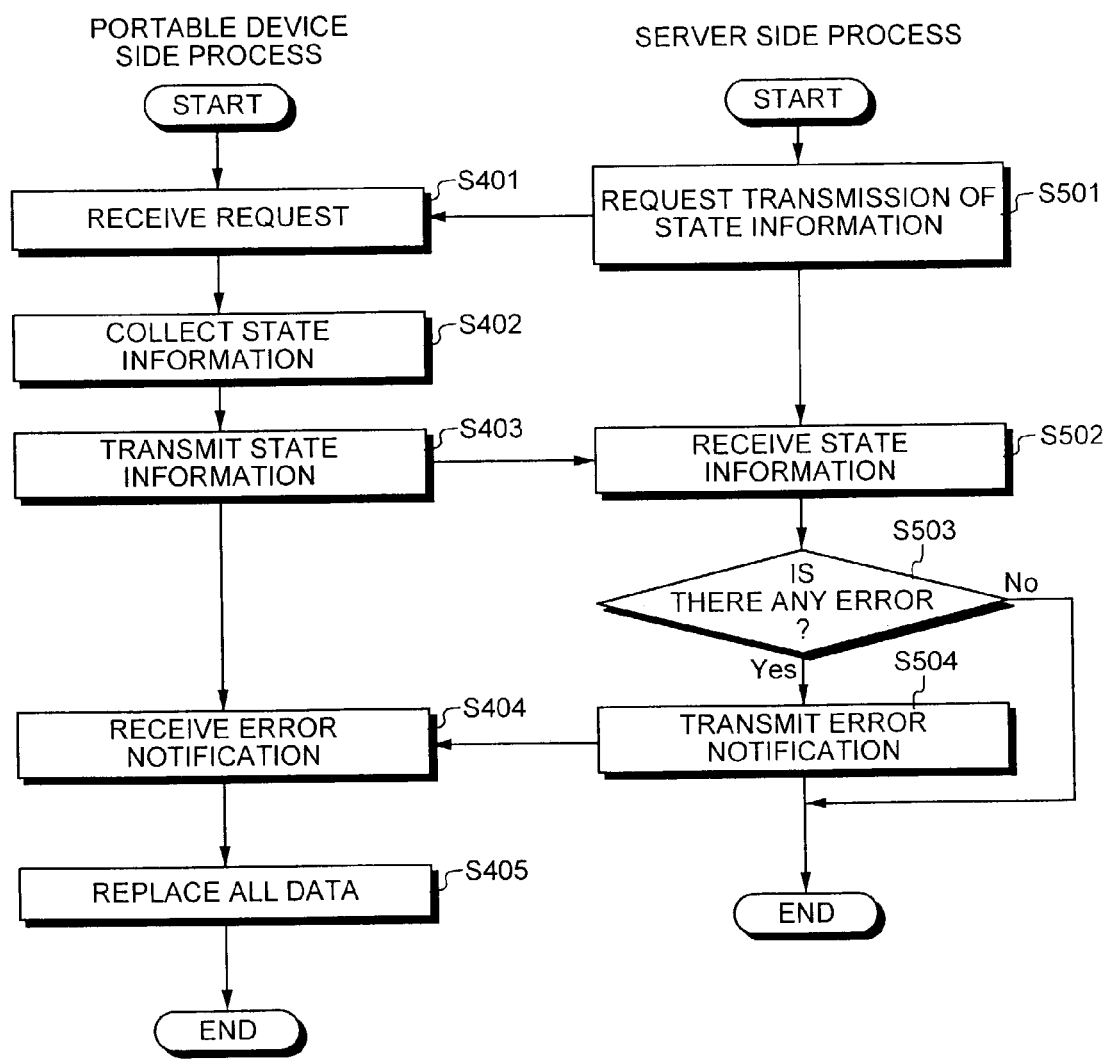

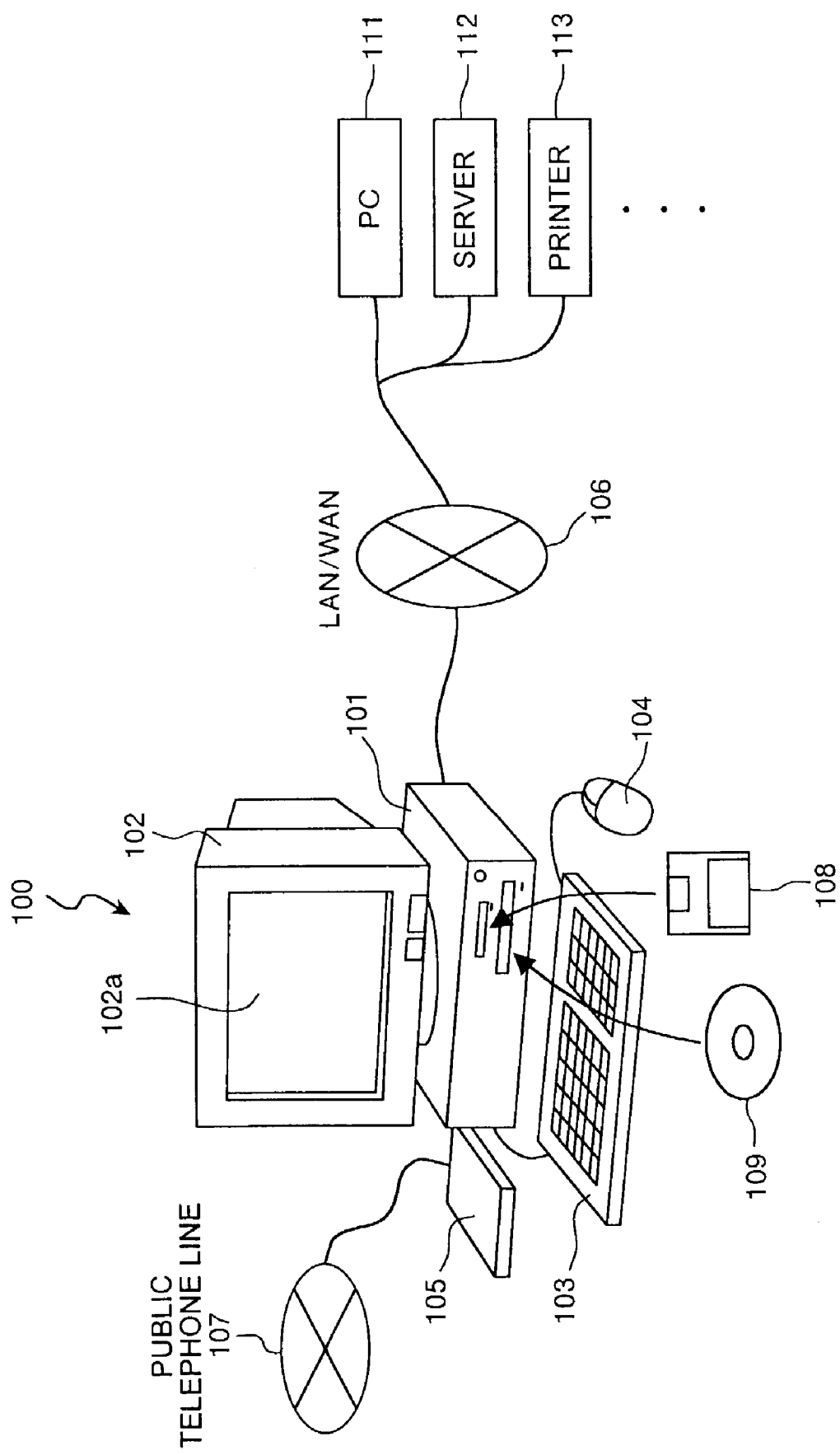

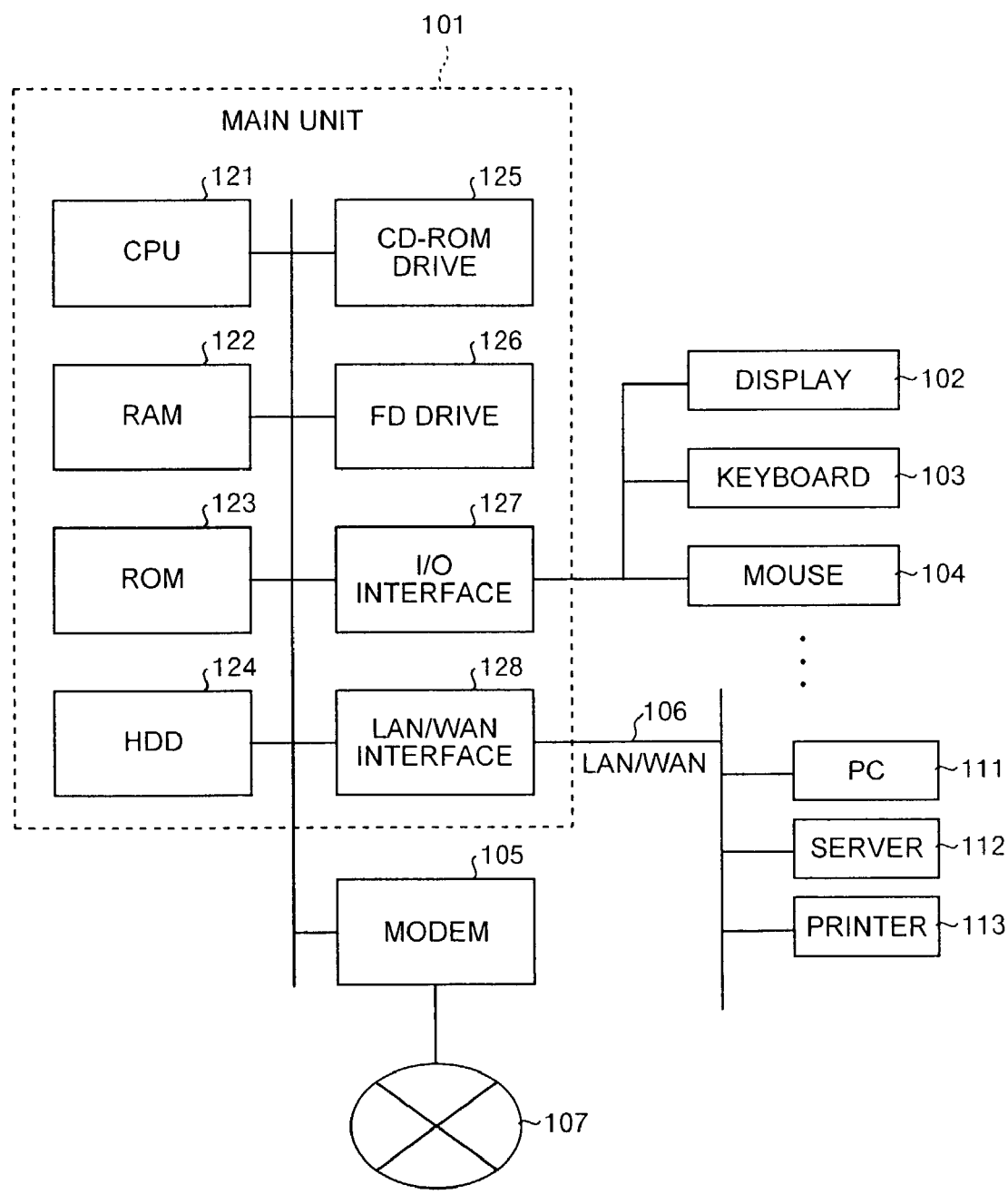

PORTABLE INFORMATION DEVICE, METHOD FOR RECOVERING DATA IN PORTABLE INFORMATION DEVICE, AND COMPUTER PRODUCT

BACKGROUND OF THE INVENTION

1) Field of the Invention

The present invention relates to a technology for speedily and reliably recovering data, such as application software and/or settings data, in a portable information device when the data has errors.

2) Description of the Related Art

Conventionally, a portable information device for communications has a volatile memory of a predetermined size, a nonvolatile memory, and a battery. The volatile memory is usually loaded with an application software and settings data. Further, the portable information device controls the execution of the application software on receiving the request from the user and provides various services to the user.

Generally, in personal computers, the application software is loaded beforehand in the hard disk drive and, during execution, the application software is loaded in the volatile memory that may be a random access memory (RAM) or the like. Particularly, because the portable information device does not possess a hard disk drive (HDD), the application software is loaded in a RAM and the battery supplies the required power for storing the data in the RAM. Particularly, when data of the RAM is deleted or damaged, as a result of an unstable supply of current from the battery to the RAM, there is a need to reconnect the portable information device to the personal computer or the like and reload the application software.

When the data in the RAM is deleted or damaged, the portable information device cannot function normally because the application software cannot be executed properly. Supplying a stable power supply to the RAM can solve this problem. However, it is practically not possible for the battery to stably supply power to the RAM, because that power is obtained from the battery only when the battery is used.

Some of the application software is customizable based on the requirements of the user and data related to the customization is stored in the RAM. If this data related to the customization gets deleted or damaged as a result of an unstable power supply, all the effort put into the customization of the application software is rendered useless. Therefore, there are difficulties in using the customizable type of application software in the portable information device.

Methods for recovering the data, if the data is deleted or damaged, have been suggested. For example, Japanese Patent Laid-Open Publication No. 5-241970 describes one method. According to the method disclosed in this publication, the data loaded in the memory, which is powered by the battery, is protected by simple operations. Moreover, the data can easily be recovered and restored if the data stored in the memory is deleted or gets damaged while the battery is disconnected.

Japanese Patent Laid-Open Publication No. 9-204205 discloses another method for recovering the data. According to the method disclosed in this publication, when the control program is damaged, it is recovered and executed. Moreover, the information relating to why and how the control program was damaged is stored for future reference and analysis.

However, a problem with the method disclosed in Japanese Patent Laid-Open Publication No. 5-241970, that it is not possible to determine the exact time of damage of data and ensure the reliability of the recovered backup data, because a detecting unit specifically meant for detecting the damage of data is not provided. In addition, even when it is possible to make corrections in the damaged data by determining the exact position, there is a problem that because duplication of backup is required to be performed on the data, it takes a long time for the recovery of the data.

In the method disclosed in Japanese Patent Laid-Open Publication No. 9-204205, whether or not the data is damaged is determined by comparing the control program with the backup data stored in a nonvolatile memory. However, the user customizes the control program while he/she is using the portable terminal, on the other hand the backup data remains unchanged. Therefore, there is a problem in that the presence of an error cannot be determined by comparison of the control program customized by the user and backup data that is unchanged. Moreover, there is a problem that a long time is required for the comparison of the data because each datum of the control program is compared with each datum of the backup data.

SUMMARY OF THE INVENTION

According to the portable information device of the present invention, a volatile memory stores a first information, the first information stored in the volatile memory is also stored in a nonvolatile memory as a second information. Moreover, it is decided whether or not there is an error in the first information, and if it is decided that there is an error in the first information, then the first information is recovered based on the second information in the non-volatile memory.

Whether there is an error in the first information may be decided based on a parity bit for each data block of the first information or based on an error correction code of a specific bits for each data block of the first information.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 9 is a flowchart that explains the recovery process of errors in the application software that is connected to the client portable information device and the server shown in FIG. 8.

FIG. 10 shows the system configuration of a computer system according to a fifth embodiment of this invention.

FIG. 11 is a block diagram that shows the system configuration of a main unit of the computer system shown in FIG. 9 according to the fifth embodiment.

DETAILED DESCRIPTION OF THE EXEMPLARY EMBODIMENTS

Exemplary embodiments of the method, a portable information device, and a computer product according to the present invention are explained below with reference to the accompanying drawings.

A first, second, and third embodiment of the present invention explains a portable information device 10. A fourth embodiment of the present invention explains a system that comprises a portable information device 10 and a server 60. Finally, a fifth embodiment explains a computer system that executes a computer program according to the present invention.

Figure 1:
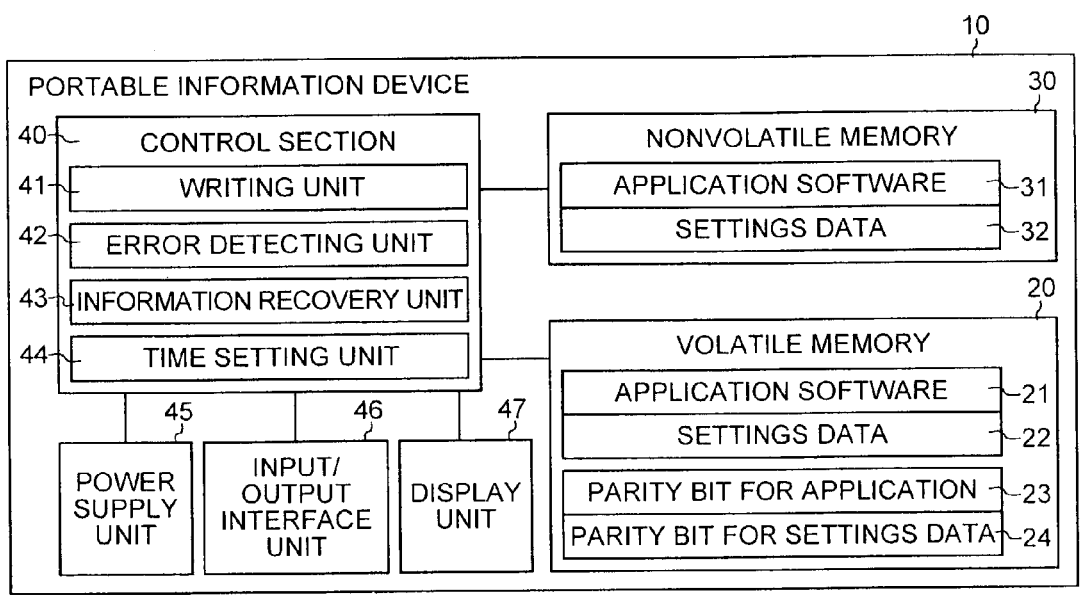
FIG. 1 is a functional block diagram that shows the configuration of a portable information device according to a first embodiment of this invention.

First, the configuration of the portable information device according to the first embodiment will be explained. FIG. 1 is a functional block diagram that shows the configuration of the portable information device 10 according to the first embodiment.

The portable information device 10 consists of a volatile memory 20, a nonvolatile memory 30, a control section 40, a power supply unit 45, an input/output interface unit 46, and a display unit 47. The main concept of the first embodiment will be explained by focusing on the description of the volatile memory 20, the nonvolatile memory 30, and the control section 40. Finally, the explanation of the power supply unit 45, the input/output interface unit 46, and the display unit 47 will be given.

The volatile memory 20 may be a RAM or the like and stores an application software 21, a settings data 22, a parity bit 23 for the application software 21, and a parity bit 24 for the settings data 22. The parity bit 23 is used for detecting errors in the data blocks of the application software 21 and the parity bit 24 is used for detecting errors in the data blocks of the settings data 22.

Data stored in a RAM is erased if the power supply to the RAM is stopped. Therefore, there is a problem with the RAM in that power needs to be constantly supplied to the RAM if the data is to be maintained. In addition, in the case of the RAM, occurrences of errors in reading of data or damage of data due to static electricity are common problems.

Figure 2:
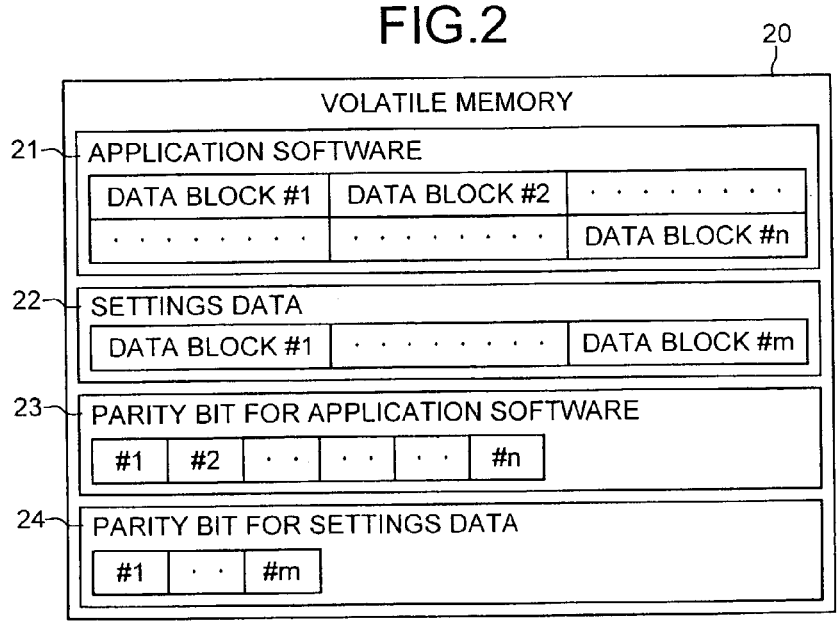
FIG. 2 explains the configuration of the data stored in a volatile memory shown in FIG. 1.

FIG. 2 explains the configuration of the data stored in the volatile memory 20. The parity bit 23 and the parity bit 24 are stored corresponding to the data blocks of the application software 21 and the settings data 22. The portable information device 10 determines errors in the data blocks of the application software 21 and the settings data 22 based on whether the binary data of the parity bit 23 and 24 is odd or even.

The application software 21 has features such as creation, transmission and/or reception of electronic mails, schedule management, the Internet browsing, document creation, dictionary reference and the like. The settings data 22 is constantly updated when the user customizes the features of the application software 21.

The nonvolatile memory 30 maybe a flash memory or the like and stores an application software 31 and settings data 32. The application software 31 and settings data 32 are updated to the application software 21 and the settings data 22, respectively, when certain conditions are satisfied. The application software 31 and settings data 32 are backups meant for storing the application software 21 and the settings data 22, and the application software 31 and settings data 32 are used to recover the application software 21 and the settings data 22 if there is any problem (deletion or damage) with the later.

The control section 40 consists of a writing unit 41, an error detecting unit 42, an information recovery unit 43, and a time setting unit 44. The control section 40 controls the operation of the portable information device 10 and executes the application software 21.

The writing unit 41 functions when installing the application software 21 and the settings data 22 in the volatile memory 20 or when the user updates the settings data 22. The writing unit 41 also writes the parity bits 23 and 24 in the volatile memory 20. Further, the writing unit 41 writes the application software 21 over the application software 31, and writes the application software 22 over the application software 32.

The error detecting unit 42 determines whether there is an error in the data including any of the application software 21 and the settings data 22 while the writing unit 41 is writing the data from the volatile memory 20 over the nonvolatile memory 30 and allows writing of the data only when there is no error in the data. The error detecting unit 42 determines whether there is an error in the application software 21 or the settings data 22 based on the parity bits 23 and 24, respectively.

If there is any problem with the application software 21 and/or the settings data 22, the information recovery unit 43 recovers the data by copying all or pieces of the application software 31 and/or the settings data 32 over the application software 21 and/or the settings data 22.

The time setting unit 44 sets the timings for detecting errors in the application software 21 and the settings data 22 and updating the data in the nonvolatile memory 30. The error detecting unit 42 determines errors in the application software 21 and the settings data 22 at the timings set by the time setting unit 44.

In this manner, if an error is detected in the data stored in the volatile memory 20, the data with the error is recovered with the data in the nonvolatile memory 30. As a result, the data can be recovered speedily and reliably.

The power supply unit 45 may consist of a lithium ion-battery or the like and supplies power to each unit of the portable information device 10. The power supply unit 45 generally has a suspend state in which power supply to those units that are not active is stopped to reduce power consumption.

The input/output interface unit 46 includes a personal computer (PC) interface, a card memory interface, a keyboard interface, and the like. The PC interface maybe a cable, a cradle, or the like through which connection to the computer is established. The card memory interface maybe a compact flash (CF) card, a secure digital (SD) card, or the like.

Specifically, the portable information device 10 reads the application software 21 that is written in the CD-ROM from the PC through the PC interface. Further, the portable information device 10 may have global positioning system (GPS) functionality, wireless local area network (LAN) functionality, Bluetooth functionality, or the like by connecting to the CF card or the SD card.

The display unit 47 may consist of a touch panel type of liquid crystal display (LCD) and it displays text, images, and a menu to the user.

Figure 3:
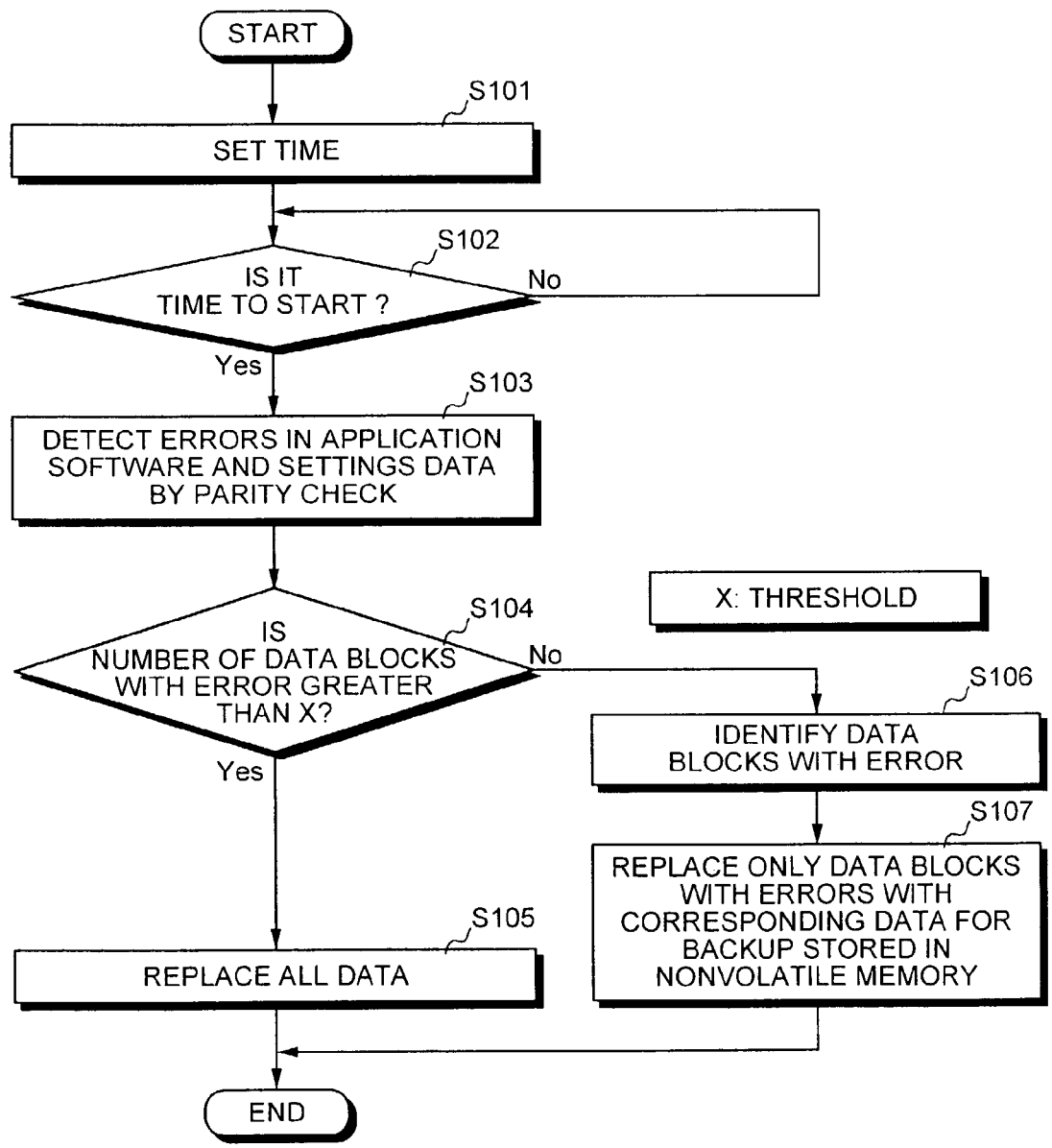
FIG. 3 is a flowchart that explains the recovery process of errors in an application software and settings data of the portable information device according to the first embodiment.

FIG. 3 is a flowchart that explains the recovery process performed by the portable information device 10. It is assumed here that determination of whether or not there is an error in the application software 21 and the settings data 22 is performed each time the power supply unit 45 is booted and performed periodically while the portable information device 10 is being used. Although the flowchart of FIG. 3 explains the recovery process that is performed periodically while the portable information device 10 is being used, the recovery process performed each time the power supply unit 45 is booted is very similar and so will be omitted.

First, the time setting unit 44 sets the time at which the recovery process is to be started (step S101). The error detecting unit 42 determines whether or not it is the time set to start the error detecting process (step S102). If it is the time set to start the recovery process, the error detecting unit 42 determines whether or not there is an error in the data blocks of the application software 21 and the settings data 22 based on the parity bits 23 and 24, respectively (step S103).

When determining an error in a data block based on parity, for example, a parity bit of 1 (i.e., odd) is set with respect to that data block. Then the parity of that data is checked after some time. If the parity of that data block is now even, in other words, if the parity has changed from odd to even, then it is considered that the data block is in error. Any other known method for determining an error in the data block based on the parity may be employed.

Then, the error detecting unit 42 determines whether the number of data blocks with errors is greater than a predetermined threshold X (step S104). When the number of data blocks with errors exceeds the predetermined threshold X (Yes at step S104), the information recovery unit 43 replaces all the application software 21 with the application software 31 and the settings data 22 with the settings data 32 (step S105). In other words, when a considerable number of data blocks have errors, then all of the data is updated.

On the other hand, when the number of data blocks with errors does not exceed the predetermined threshold X (No at step S104), the error detecting unit 42 identifies and tracks the data blocks of the application software 21 and the settings data 22 having errors (step S106). Then, the information recovery unit 43 replaces only those data blocks that are identified with errors with the corresponding backup data stored in the nonvolatile memory 30 (step S107). In other words, if the number of data blocks with errors is few, then all the data is not recovered, but only the data blocks with errors are recovered so that the recovery process can be performed speedily.

Therefore, as explained, when errors are detected in the application software 21 and the settings data 22 and the number of data blocks with errors is greater than the predetermined threshold X, the information recovery unit 43 replaces all the data blocks with the data stored in the nonvolatile memory 30. On the other hand, when the number of data blocks with errors is less than the predetermined threshold X, the information recovery unit 43 replaces only those data blocks having errors with the corresponding data stored in the nonvolatile memory 30. In this manner, the error detecting unit 42 detects the errors in the data blocks of the application software 21 and the settings data 22 and the information recovery unit 43 recovers the detected errors in a short duration, thus enabling the stable execution of the application software 21.

The method of determination of errors in data blocks by parity checking according to the first embodiment has been explained above, but the error detecting unit 42 may also determine the errors by the check sum method. Specifically, in the check sum method, the data space of the application software 21 and the settings data 22 is divided into a predetermined number of data blocks and the check sum of the predetermined number of data blocks is calculated. Then, the error detecting unit 42 determines the errors by comparing the check sum of data blocks having errors with the check sum of the predetermined number of data blocks before the errors occur.

Figure 4:
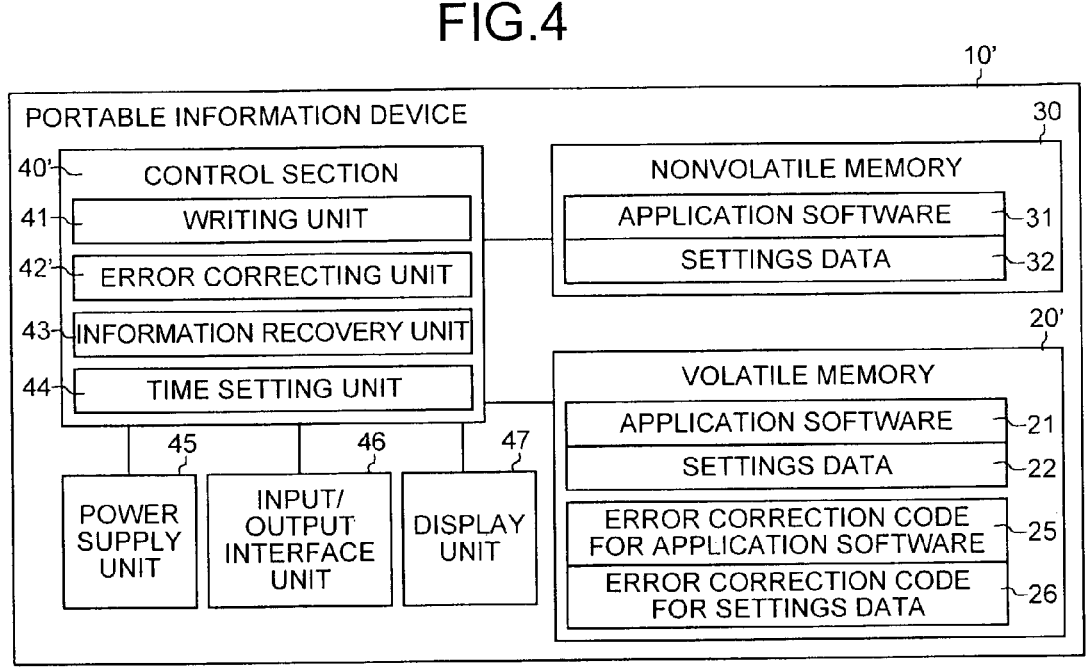
FIG. 4 is a functional block diagram explaining the configuration of the portable information device according to a second embodiment of this invention.

Next, the configuration of the portable information device 10' according to the second embodiment will be explained using FIG. 4. The configuration of the portable information device 10' according to the second embodiment is basically the same as that of the first embodiment, but is different in that there are provided a volatile memory 20' and a control section 40' in place of the volatile memory 20 and the control section 40. The volatile memory 20' includes an error correction code 25 for the application software 21 and an error correction code 26 for settings data 22 in the place of the parity bits 23 and 24 in the volatile memory 20 respectively. Further, the control section 40' includes an error correcting unit 42' instead of the error detecting unit 42 in the control section 40.

Figure 5:
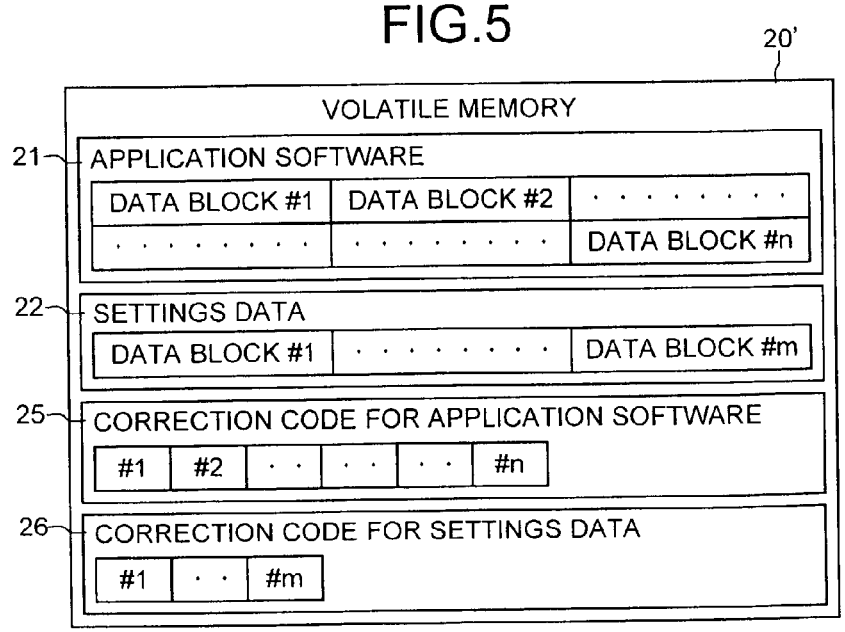
FIG. 5 explains the configuration of the data stored in a volatile memory shown in FIG. 4.

FIG. 5 explains the configuration of the data stored in a volatile memory 20'. The volatile memory 20' stores the error correction codes 25 and 26 in correspondence with the application software 21 and the settings data 22, respectively. The error correcting unit 42' detects errors in the data blocks of the application software 21 and the settings data 22 by means of the error correction codes 25 and 26, respectively, and corrects the detected errors.

The error correcting unit 42' corrects the errors depending on the number of bits of error correction codes 25 and 26. Specifically, for example, when a binary data block of the application software 21 is 32 bits, the error correction code 25 has an optional predetermined number of 6 bits. Thus, the predetermined number of bits of the error correction codes 25 and 26 are specifically added to the data blocks of the application software 21 and the settings data 22, respectively, to correct errors. Therefore, in this case, the minimum bits required for correcting errors and running the application software 21 are 6 bits and 32 bits, respectively.

The memory size of the application software 21 and the settings data 22 may change. In that case, the number of bits of the error correction codes 25 and 26 may be changed depending on the size of the unused memory space. The information recovery unit 43 corrects errors when correction is possible within the range of the predetermined number of bits. When the information recovery unit 43 cannot correct errors within the range of the predetermined number of bits, it replaces the data blocks of the volatile memory 20' having errors with the backup data stored in the nonvolatile memory 30.

Figure 6:
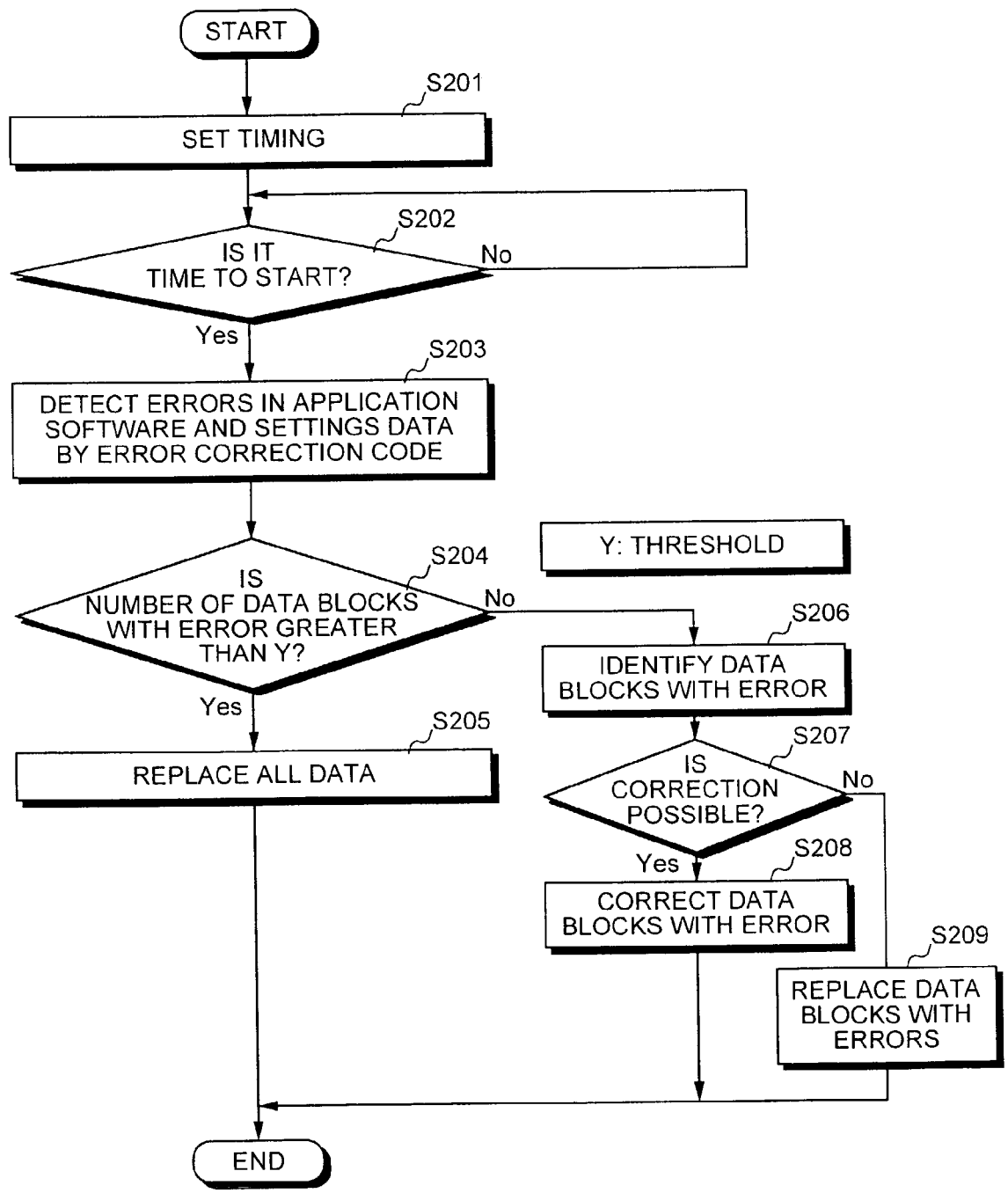
FIG. 6 is a flowchart that explains the correction and recovery process of errors in the application software and settings data of the portable information device shown in FIG. 4 according to the second embodiment.

Next, the correction and recovery process of errors in the application software 21 and the settings data 22 of the portable information device 10' according to the second embodiment will be explained using FIG. 6.

First, the time setting unit 44 sets the time at which the recovery process is to be started (step S201). The error correcting unit 42' determines whether it is the set time to start the recovery process (step S202). If it is the set time to start the recovery process, the error correcting unit 42' determines whether there is an error in the data blocks of the application software 21 and the settings data 22 based on the error correction codes 25 and 26, respectively (step S203).

Then, the error correcting unit 42' determines whether the number of data blocks with error is greater than a predetermined threshold Y (step S204). When the number of data blocks with error exceeds the predetermined threshold Y (Yes at step S204), the information recovery unit 43 replaces all the application software 21 with the application software 31 and the settings data 22 with the settings data 32 (step S205).). In other words, when a considerable number of data blocks have errors, then all of the data is updated.

On the other hand, when the number of data blocks with errors does not exceed the predetermined threshold Y (No at step S204), the error correcting unit 42' identifies and tracks the data blocks of the application software 21 and the settings data 22 having errors (step S206). Then, the information recovery unit 43 determines whether or not it is possible to correct errors in the data blocks by the error correction codes 25 and 26 (step S207). When the correction is possible (Yes at step S207), the information recovery unit 43 corrects the data blocks with errors (step S208). When the correction is not possible (No at step S207), the information recovery unit 43 replaces those data blocks that are identified with errors with the corresponding backup data stored in the nonvolatile memory 30 (step S209). In other words, if the number of data blocks with error is few, then all the data is not recovered, but only the data blocks with errors are recovered so that the recovery process can be performed speedily.

Therefore, as explained, when errors are detected in the application software 21 and the settings data 22 and the number of data blocks with errors is greater than the predetermined threshold Y, the information recovery unit 43 replaces all the data blocks with the data stored in the nonvolatile memory 30. On the other hand, when the number of data blocks with errors is lesser than the predetermined threshold Y, and when it is possible to correct the errors based on the error correction code the error correction unit 42' corrects the error, and if it is not possible to correct the error the information recovery unit 43 replaces only those data blocks having errors with the corresponding data stored in the nonvolatile memory 30. In this manner, the error detecting unit 42 detects the errors in the data blocks of the application software 21 and the settings data 22 and the information recovery unit 43 recovers the detected errors in a short duration, thus enabling the stable execution of the application software 21.

Figure 7:
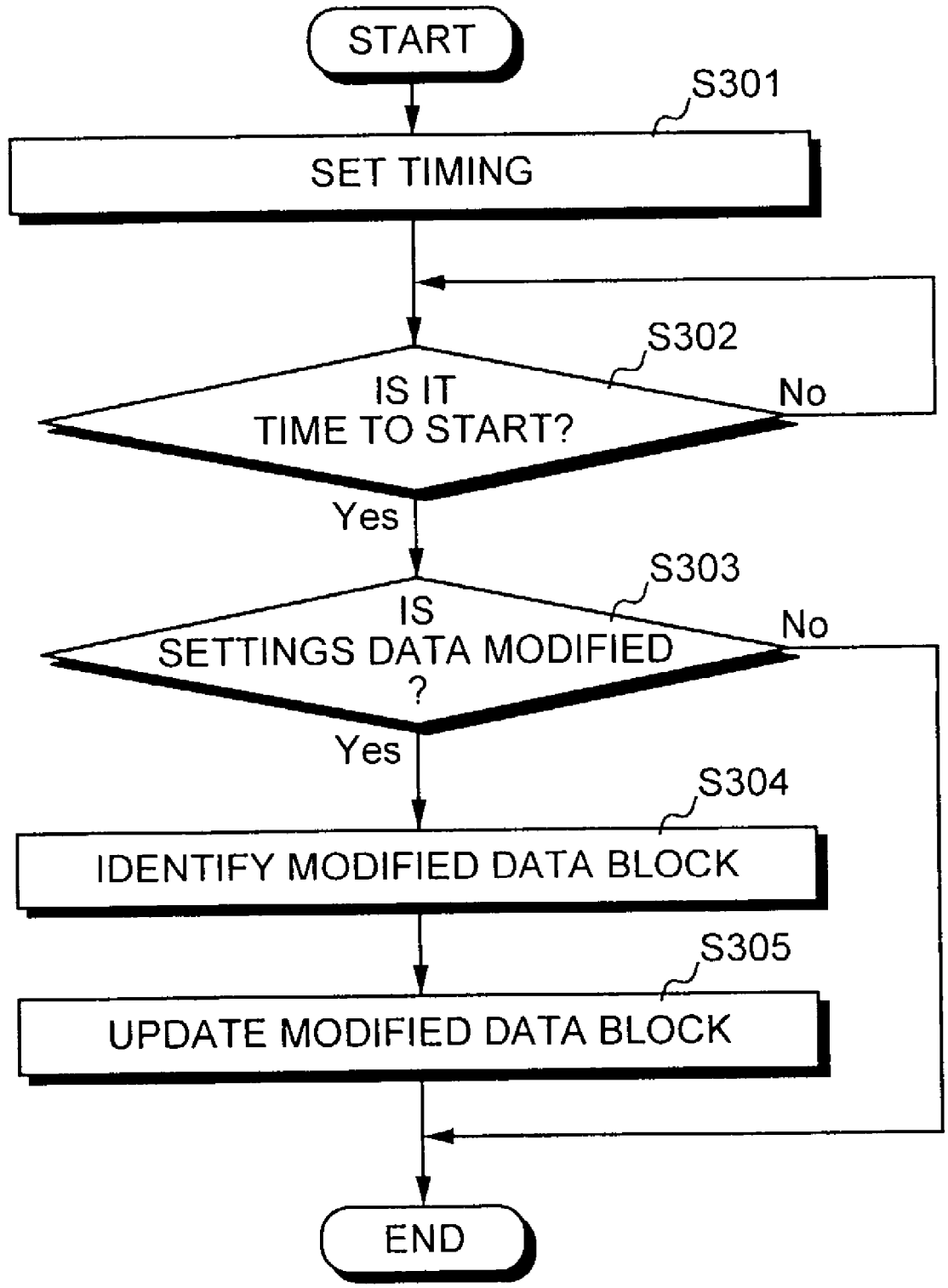
FIG. 7 is a flowchart that explains the process of updating the backup data of the portable information device according to a third embodiment of this invention.

Next, an updating process for updating the data in the nonvolatile memory is explained as a third embodiment. FIG. 7 is a flowchart of the updating process. It is assumed here that the backup process is performed by the portable information device 10 of the first embodiment, nevertheless the portable information device 10' of the second embodiment may be made to perform this backup process.

First, the time setting unit 44 sets the time at which the updating process is to be started (step S301). The writing unit 41 determines whether it is the set time to start the updating process (step S302). When it is the set time to start the updating process, the writing unit determines whether the user has modified the settings data 22 (step S303). When the settings data 22 is not modified (No at step S303), the writing unit 41 does not do anything. In other words, if the settings data 22 are not modified, there is no need to update the data, therefore, the writing unit 41 ends the process.

On the other hand, when the user has modified the settings data 22 (Yes at step S303), the writing unit 41 identifies the data blocks of the settings data 22 that have been modified (step S304). Then, the writing unit 41 copies the modified blocks of the settings data 22 over the corresponding data blocks of the settings data 32 (step S305). As a result the latest version of the settings data is stored in the nonvolatile memory 30 as the settings data 32.

In this manner, the writing unit 41 updates the data blocks of the data stored in the nonvolatile memory 30, when the settings data 22 is modified, thus enabling the stable execution of the application software 21 and increasing the reliability of the modified and recovered data.

It has been explained above how to set a time to start the updating process and start the updating process when the set time is reached. Nevertheless, the user may start the updating process at a desired time. For example, the user may start the updating process when he/she modifies the settings data 22.

Figure 8:
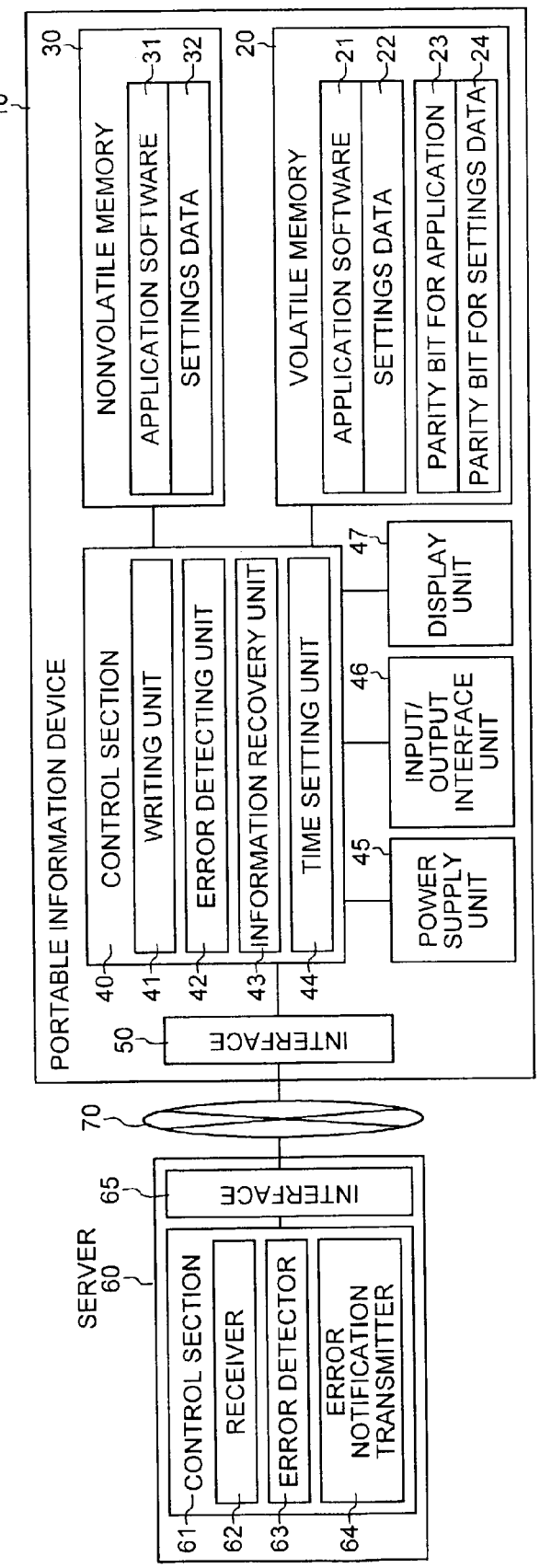
FIG. 8 is a functional block diagram that shows the configuration of the portable information device connected to a server according to a fourth embodiment of this invention.

Next, a fourth embodiment of the present invention will be explained with reference to FIG. 8. In this fourth embodiment the portable information device 10 of the first embodiment is connected to a server 60. It is needless to mention that the portable information device 10' of the second embodiment may be connected to the server 60.

The portable information device 10 is connected to the server 60 through an interface 50 in the portable information device 10, a network 70, and an interface 65 in the server 60 so that transmission and reception of data can be performed between the portable information device 10 and the server 60. The network 70 may be wired or wireless.

The server 60 provides electronic mail service, Internet service, and the like to the portable information device 10 and consists of at least of a control section along with the interface 65.

The control section 61 may include a receiver 62, an error detector 63, and an error notification transmitter 64. The receiver 62 periodically receives information related to the operation state of the portable information device 10 (hereinafter "state information") from the portable information device 10. The state information includes data such as rate of operation, number of exceptional errors, data transmission errors, and the like. The error detector 63 detects the errors that occur during the operation of the portable information device 10 by dividing and sorting the received information. The error notification transmitter 64 sends error notifications to the portable information device 10.

Next, the recovery process according to the fourth embodiment will be explained using the flowchart shown in FIG. 9.

First, the server 60 periodically requests the portable information device 10 to transmit the state information (step S501). The portable information device 10 receives the request from the server 60 (step S401). Following this, the portable information device 10 collects the state information (step S402) and sends the collected state information to the server 60 (step S403).

The receiver 62 of the server 60 receives the state information send by the portable information device 10 (step S502). Following this, the error detector 63 detects the presence of errors in the state information (step S503). When the error detector 63 cannot detect any error in the state information (No at step S503), the process ends. When the error detector 63 detects errors in the state information (Yes at step S503), the error notification transmitter 64 transmits the error notification to the portable information device 10 (step S504).

When the portable information device 10 receives the error notifications (step S404), it updates the application software 21 and the settings data 22 with the application software 31 and the settings data 32 (step S405).

Thus, according to the fourth embodiment, the portable information device 10 updates the application software 21 and the settings data 22 with the data stored in the nonvolatile memory 30, on receiving the error notification from server 60. Thus it is possible to recover the application software 21 and the settings data 22 in a short duration and stably execute the application software 21 based on an instruction from the server 60 that is an external device.

In the fourth embodiment, a recovery process that is very similar to the one described in the first embodiment has been explained. Nevertheless, the recovery process that is very similar to the one described in the second embodiment and/or the updating process that is very similar to the one described in the third embodiment may also be employed in the fourth embodiment.

A computer system may be made to realize the portable information devices and the different process explained above by running a computer program on the computer system. The computer system may be a personal computer, a workstation, or the like. Such a computer system is explained below as a fifth embodiment of the present invention.

FIG. 10 shows a perspective view of a computer system 100 according to the fifth embodiment. The computer system 100 has a main unit 101, a display unit 102, a keyboard 103, and a mouse 104. The display unit 102 displays data and images in a display screen 102a based on instructions from the main unit 101. The keyboard 103 is used to input information to the computer system 100. The mouse 104 is used to move the cursor on the display screen 102a of the display unit 102. The computer system 100 may be connected to another personal computer 111, a server 112, and printer 113, or the like through a network such as local area network (LAN) or wide area network (WAN). The computer system 100 may also be connected to a public telephone line 107 through a modem 105.

FIG. 11 shows a functional configuration of the main unit 101. The main unit 101 consists of a CPU 121, a RAM 122, a ROM 123, a HDD 124, a CD-ROM drive 125 that can at least read data from a CD-ROM 109 (see FIG. 10), a flexible disk (FD) drive 126 that can at least read data from a flexible disk 108 (see FIG. 10), the display unit 102, an input output (I/O) interface 127, and a local area network or wide area network (LAN/WAN) interface 128. The display 102, the keyboard 103, and the mouse 104 are connected to the mail unit 101 via the I/O interface 27. The main unit is connected to the LAN/WAN 106 via the LAN/WAN interface 128.

The computer system 100 realizes the portable information device 10 by reading a computer program stored in a storage medium. The storage medium may be a portable storage device or a fixed storage device storage medium. The portable storage device may consist of the flexible disk 108, the CD-ROM 109, a DVD disk, a magneto-optical disk, an IC card, or the like. The fixed storage device may consist of the HDD 124, the ROM 123, and the RAM 122 or the like that are permanently installed inside the computer system 100. On the other hand the computer program may be stored on an external device that is connected to the computer system 100 via the LAN/WAN 106 or the modem 105.

The computer system 100 reads the computer program and executes the computer program to realize the portable information device 10 and the different processes explained above. It is needless to say that the computer program may be executed on another personal computer (e.g., the personal computer 111 or the server 112) connected to the computer system 100.

According to the present invention, the portable information device 10 stores error free data in the nonvolatile memory 30, and when an error is detected in the data in the volatile memory, the data in the volatile memory is updated using the data in the nonvolatile memory. As a result, the errors in the application software and settings data, which are stored in the volatile memory, can be recovered or corrected speedily and reliably.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A portable information device for communications comprising:
    a volatile memory that stores first information;
    a nonvolatile memory that stores second information;
    an error detecting unit that detects a number of erroneous data-blocks, which include errors, in the first information, and determines whether the number is greater than a predetermined threshold;
    a writing unit that writes the first information over the second information, and stores the first information as updated information in the nonvolatile memory, when the detecting unit detects that there is no erroneous data-block in the first information; and
    an information recovering unit that replaces the first information stored in the volatile memory with all of the updated information stored in the nonvolatile memory, when the error detecting unit determines that the number is greater than the threshold, and
    replaces the erroneous data-blocks in the first information stored in the volatile memory with a portion of data-blocks that are included in the updated information stored in the nonvolatile memory, the portion of data-blocks corresponding to the erroneous data-blocks in the first information in the volatile memory, when the error detecting unit determines that the number is not greater than the threshold.

2. The portable information device according to claim 1, wherein the writing unit writes a parity bit for the first information in the volatile memory, and the error detecting unit detects whether there is an error in the first information based on the parity bit.

3. The portable information device according to claim 2, further comprising a setting unit that sets a timing condition, wherein the writing unit writes the first information stored in the volatile memory into the nonvolatile memory as the updated information when the timing condition set by the setting unit is satisfied.

4. The portable information device according to claim 2, further comprising a setting unit that sets a timing condition, wherein the error detecting unit starts the detection of the error in the first information using the parity bit when the timing condition set by the setting unit is satisfied.

5. The portable information device according to claim 1, further comprising a receiving unit that receives, from an external device, an instruction on starting of the recovery of the first information,
    wherein the information recovering unit recovers the first information using the second information when the receiving unit receives the instruction.

6. A portable information device for communications comprising:
- a volatile memory that stores first information;
- a nonvolatile memory that stores second information;
- an error correcting unit that detects a number of erroneous data-blocks, which include errors, in the first information, determines whether the number is greater than a predetermined threshold, determines whether the erroneous data-blocks are correctable, and corrects the erroneous data-blocks when determined to be correctable;
- a writing unit that writes the first information over the second information, and stores the first information as updated information in the nonvolatile memory, when the error correcting unit detects that there is no erroneous data-block in the first information; and
- an information recovering unit that replaces the first information stored in the volatile memory with all of the updated information stored in the nonvolatile memory, when the error correcting unit determines that the number is greater than the threshold, and replaces the erroneous data-blocks in the first information stored in the volatile memory with a portion of data-blocks that are included in the updated information stored in the nonvolatile memory, the portion of data-blocks corresponding to the erroneous data-blocks in the first information in the volatile memory, when the error correcting unit determines that the number is not greater than the threshold and when the error correcting unit determines that the erroneous data blocks are not correctable, wherein
    - the error correcting unit corrects the erroneous data-blocks in the first information in the volatile memory, when the error correcting unit determines that the number is not greater than the threshold and when the error correcting unit determines that the erroneous data-blocks are correctable.

7. The portable information device according to claim 6, further comprising a setting unit that sets a timing condition,
- wherein the writing unit writes first information stored in the volatile memory into the nonvolatile memory as the updated information when the timing condition set by the setting unit is satisfied.

8. The portable information device according to claim 6, further comprising a setting unit that sets a timing condition,
- wherein the error correcting unit starts the detection of the error in the first information using the error correction code when the timing condition set by the setting unit is satisfied.

9. A method of recovering information, the method being realized on a portable information device for communications having a volatile memory with a first information stored therein and a nonvolatile memory with a second information stored therein, the method comprising the steps of:
- detecting a number of erroneous data-blocks, which include errors, in the first information;
- determining whether the number is greater than a predetermined threshold;
- writing the first information stored in the volatile memory over the second information, storing the first information as an updated information in the nonvolatile memory, when it is detected that there is no erroneous data-block in the first information at the detecting step; and
- recovering the first information in the volatile memory by replacing the first information stored in the volatile memory with all of the updated information stored in the nonvolatile memory, when it is determined that the number is greater than the threshold at the determining step, and
- by replacing the erroneous data-blocks in the first information stored in the volatile memory with a portion of data-blocks that are included in the updated information stored in the nonvolatile memory, and the portion of data-blocks correspond to the erroneous data-blocks in the first information in the volatile memory, when it is determined that the number is not greater than the threshold at the determining step.

10. The method according to claim 9, wherein the writing further includes writing a parity bit in the volatile memory, and at the detecting step whether or not there is an error in the first information is decided based on the parity bit.

11. The method according to claim 10, further comprising setting a timing condition,
- wherein at the writing step the first information stored in the volatile memory is written into the nonvolatile memory as the updated information when the timing condition set by the setting unit is satisfied.

12. The method according to claim 10, further comprising a step of setting a timing condition,
- wherein at the detecting step the detection of the error in the first information is started using the parity bit when the timing condition set by the setting unit is satisfied.

13. A method of recovering information, the method being realized on a portable information device for communications having a volatile memory with a first information stored therein and a nonvolatile memory with a second information stored therein, the method comprising the steps of:
- detecting a number of erroneous data-blocks, which include errors, in the first information;
- first determining whether the number is greater than a predetermined threshold;
- second determining whether the erroneous data-blocks are correctable;
- writing the first information stored in the volatile memory over the second information, storing the first information as an updated information in the nonvolatile memory, when it is detected that there is no erroneous data-block in the first information at the detecting; and
- recovering the first information in the volatile memory,
- by replacing the erroneous data-blocks in the volatile memory with all of the updated information stored in the nonvolatile memory, when it is determined that the number is greater than the threshold at the determining, and
- by replacing the erroneous data-blocks in the first information stored in the volatile memory with a portion of data-blocks that are included in the updated information stored in the nonvolatile memory, and the portion of data-blocks correspond to the erroneous data-blocks in the first information in the volatile memory, when it is determined that the number is not greater than the threshold at the first determining step and when it is determined that the erroneous data-blocks are not correctable at the second determining step, wherein
    - the correcting includes correcting the erroneous data-blocks in the first information in the volatile memory, when it is determined that the number is not greater than the threshold at the first determining step and when it is determined that the erroneous data-blocks are correctable at the second determining step.

14. The method according to claim 13, further comprising setting a timing condition,
　　wherein at the writing step the first information stored in the volatile memory is written into the nonvolatile memory as the updated information when the timing condition set by the setting unit is satisfied.

15. The method according to claim 13, further comprising a step of setting a timing condition,
　　wherein at the detecting step the detection of the error in the first information is started using the error correction code when the timing condition set by the setting unit is satisfied.

16. A computer readable medium having a computer program, said program, when executed by a processor that realizes a method of recovering information on a portable information device for communications, the portable information device having a volatile memory with a first information stored therein and a nonvolatile memory with a second information stored therein, the method comprising the steps of:
　　detecting a number of erroneous data-blocks, which include errors, in the first information;
　　determining whether the number is greater than a predetermined threshold;
　　writing the first information stored in the volatile memory over the second information, storing the first information as an updated information in the nonvolatile memory, when it is detected that there is no erroneous data-block in the first information at the detecting step; and
　　recovering the first information in the volatile memory, by replacing the first information stored in the volatile memory with all of the updated information stored in the nonvolatile memory, when it is determined that the number is greater than the threshold at the determining step, and
　　by replacing the erroneous data-blocks in the first information stored in the volatile memory with a portion of data-blocks that are included in the updated information stored in the nonvolatile memory, and the portion of data-blocks correspond to the erroneous data-blocks in the first information in the volatile memory, when it is determined that the number is not greater than the threshold at the determining step.

* * * * *